(12) United States Patent
Minagata et al.

(10) Patent No.: US 10,734,631 B2
(45) Date of Patent: Aug. 4, 2020

(54) ELECTRICITY STORAGE DEVICE

(71) Applicant: KABUSHIKI KAISHA TOYOTA JIDOSHOKKI, Kariya-shi, Aichi-ken (JP)

(72) Inventors: Atsushi Minagata, Kariya (JP); Motoaki Okuda, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 142 days.

(21) Appl. No.: 15/755,205

(22) PCT Filed: Aug. 15, 2016

(86) PCT No.: PCT/JP2016/073836
§ 371 (c)(1),
(2) Date: Feb. 26, 2018

(87) PCT Pub. No.: WO2017/038439
PCT Pub. Date: Mar. 9, 2017

(65) Prior Publication Data
US 2018/0277822 A1    Sep. 27, 2018

(30) Foreign Application Priority Data

Sep. 1, 2015    (JP) ................................ 2015-172209

(51) Int. Cl.
| | | |
|---|---|---|
| *H01M 2/30* | (2006.01) | |
| *H01M 2/04* | (2006.01) | |
| *H01M 2/26* | (2006.01) | |
| *H01M 10/04* | (2006.01) | |
| *H01M 2/22* | (2006.01) | |
| *H01G 11/76* | (2013.01) | |
| *H01G 11/82* | (2013.01) | |
| *H01G 11/12* | (2013.01) | |
| *H01G 11/74* | (2013.01) | |
| *H01G 11/26* | (2013.01) | |
| *H01G 11/52* | (2013.01) | |
| *H01G 11/78* | (2013.01) | |
| *H01M 10/0525* | (2010.01) | |
| *H01G 11/28* | (2013.01) | |

(52) U.S. Cl.
CPC .............. *H01M 2/30* (2013.01); *H01G 11/12* (2013.01); *H01G 11/26* (2013.01); *H01G 11/52* (2013.01); *H01G 11/74* (2013.01); *H01G 11/76* (2013.01); *H01G 11/78* (2013.01); *H01G 11/82* (2013.01); *H01M 2/043* (2013.01); *H01M 2/0456* (2013.01); *H01M 2/0473* (2013.01); *H01M 2/0482* (2013.01); *H01M 2/0486* (2013.01); *H01M 2/22* (2013.01); *H01M 2/26* (2013.01); *H01M 2/266* (2013.01); *H01M 2/305* (2013.01); *H01M 10/0413* (2013.01); *H01M 10/0525* (2013.01); *H01G 11/28* (2013.01); *H01M 2220/20* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 2015/0207124 A1 | 7/2015 | Minagata et al. | |
| 2015/0340663 A1* | 11/2015 | Minagata ............ | H01M 2/0237 429/163 |

FOREIGN PATENT DOCUMENTS

| | | | |
|---|---|---|---|
| JP | 7-302616 A | | 11/1995 |
| JP | 2012-119183 A | | 6/2012 |
| JP | 2013161757 | * | 8/2013 |
| JP | 2014-123454 A | | 7/2014 |
| JP | 2015-99699 A | | 5/2015 |
| WO | WO-2014002647 A1 | * | 1/2014 |
| WO | 2014/021094 A1 | | 2/2014 |
| WO | WO-2014021094 A1 | * | 2/2014 |

OTHER PUBLICATIONS

WO2014/021094A1 Espacenet Machine Translation (Year: 2014).*
International Preliminary Report on Patentability with translation of Written Opinion dated Mar. 6, 2018, in counterpart International Application No. PCT/JP2016/073836.
International Search Report for PCT/JP2016/073836 dated Nov. 15, 2016 [PCT/ISA/210].

* cited by examiner

*Primary Examiner* — Ladan Mohaddes
(74) *Attorney, Agent, or Firm* — Sughrue Mion, PLLC

(57) ABSTRACT

The purpose of the present invention is to provide an electricity storage device, the positive electrode and negative electrode of which can be protected when housing an electrode assembly body into a case main body. A secondary battery of the present invention has a lid terminal member formed by integrating: a lid; a positive electrode terminal and a negative electrode terminal; a positive electrode conductive member and a negative electrode conductive member; and an insulating member. The lid terminal member is integrated with an electrode assembly body through a positive electrode tab group and a negative electrode tab group. The electrode assembly body includes an electrode housing separator and a negative electrode each having a bottom-side contact portion contacting the inner bottom surface of a case main body. The electrode housing separator also has a lid-side contact portion contacting the lid terminal member.

6 Claims, 6 Drawing Sheets

ELECTRICITY STORAGE DEVICE

CROSS REFERENCE TO RELATED APPLICATIONS

This application is a National Stage of International Application No. PCT/JP2016/073836, filed on Aug. 15, 2016, which claims priority from Japanese Patent Application No. 2015-172209, filed on Sept. 1, 2015.

TECHNICAL FIELD

The present invention relates to a power storage device that includes a lid terminal member including a lid, an electrode terminal, a conductive member, and an insulation member.

BACKGROUND ART

In the prior art, a power storage device is mounted on a vehicle such as an EV (electric vehicle) or a PHV (plug in hybrid vehicle) to store power that is supplied to, for example, a motor. A power storage device may be, for example, a lithium-ion rechargeable battery or a nickel-metal hydride rechargeable battery. Patent document 1 discloses an example of a rechargeable battery that includes an electrode assembly, in which a positive electrode and a negative electrode have active material layers and are layered one over the other, and a cuboid case accommodating the electrode assembly. The case includes a rectangular box-shaped case body having a closed end and an opening, through which the electrode assembly is inserted, and a flat rectangular lid closing the opening of the case body. When the positive electrode and the negative electrode are stacked in a direction in which the short sides of the case extend, the electrode assembly is accommodated in the case. Additionally, tabs (non-applied portions) project from one side of each of the positive electrode and the negative electrode. The tabs are stacked to form tab groups (non-applied groups), each of which is joined to a conductive member having the corresponding polarity. Further, the conductive member is electrically connected to an electrode terminal having the corresponding polarity.

One method for assembling such a rechargeable battery integrates the electrode assembly and the lid with each other in advance. Then, after the electrode assembly is inserted into the case body, the lid is welded to the case body. To integrate the electrode assembly and the lid with each other, the positive electrode tab group and the negative electrode tab group are each connected to a conductive member having the corresponding polarity, and each of the conductive members is connected to an electrode terminal having the corresponding polarity. Subsequently, the electrode terminals are partially inserted through two through holes formed in the lid. Then, nuts are engaged with the electrode terminals projected from the lid to fasten the electrode terminals to the lid. Consequently, the electrode assembly, which is integrated with the electrode terminals by the conductive members, is also integrated with the lid.

A rechargeable battery is designed to increase the volume of the electrode assembly to a maximum extent so that the capacity is maximized. Thus, the electrode assembly is enlarged to the maximum extent in the depth-wise direction of the case so that the electrode assembly is located in the proximity of the inner bottom surface of the case body. The electrode assembly also has two end surfaces in the stacking direction of the positive electrode and the negative electrode. The electrode assembly is also enlarged to the maximum extent in a direction in which the short sides of the case extend so that the two end surfaces are located in the proximity of inner wall surfaces of the case.

When manufacturing a rechargeable battery, the electrode assembly is accommodated in the case with the lower surface of the electrode assembly located in the proximity of the inner surface of the bottom wall of the case. However, the end surfaces of the electrode assembly are separated from the inner wall surfaces of the case by small clearances. Thus, the electrode assembly needs to be forced into the case body so that the bottom surface of the electrode assembly is located in the proximity of the inner surface of the case. As described above, when the electrode assembly and the lid are integrated with each other in advance, the lid is pushed toward the electrode assembly to force the electrode assembly into the case body.

However, the impulse of pushing the electrode assembly together with the lid may result in damage to the bottom surface of the electrode assembly when colliding with the inner surface of the case body. Also, the electrode assembly is directly pushed by the lid. This may result in damage to the positive electrode and the negative electrode when colliding with the lid.

PRIOR ART DOCUMENT

Patent Document

Patent Document 1: Japanese Laid-Open Patent Publication No. 2012-119183

SUMMARY OF THE INVENTION

Problems that are to be Solved by the Invention

It is an object of the present invention to provide a power storage device that protects a positive electrode and a negative electrode when accommodating an electrode assembly in a case body.

Means for Solving the Problem

To solve the above problem, a first aspect of the present invention provides a power storage device that includes an electrode assembly including a non-applied portion and a plurality of layers stacked together, a case body of a box shape that has a closed end and an opening, a lid that closes the opening of the case body, an electrode terminal fixed to the lid to transfer electricity from and to the electrode assembly, and a conductive member that electrically connects the non-applied portion and the electrode terminal. The electrode assembly and the non-applied portion are housed through the opening. Each layer includes a positive electrode and a negative electrode that are stacked and insulated from each other by a separator, the non-applied portion projects from one side of each of the positive electrode and the negative electrode. The lid, the electrode terminal, and the conductive member are integrated with each other to form a lid terminal member. The lid terminal member is integrated with the electrode assembly via the non-applied portion. The electrode assembly includes a bottom side contact portion that contacts an inner bottom surface of the case body. The separator includes a lid side contact portion that contacts the lid terminal member. The lid side contact portion projects beyond the one side of the negative electrode in a projection direction of the non-applied portion from the one side of the negative electrode.

EMBODIMENTS OF THE INVENTION

First Embodiment

A first embodiment of a power storage device, as a rechargeable battery, according to the present invention will now be described with reference to FIGS. 1 to 5. In the following description, the upper side and the lower side are defined as shown in FIG. 1.

Figure 1:
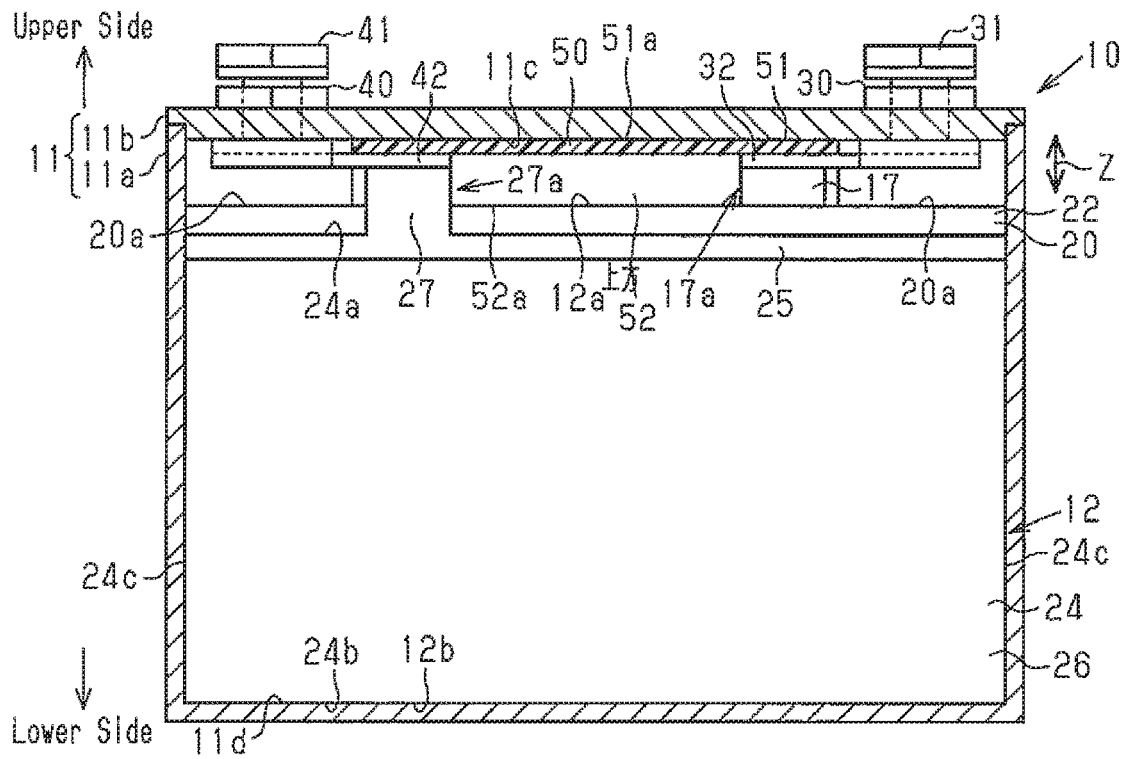
FIG. 1 is a cross-sectional view showing a first embodiment of a rechargeable battery of a power storage device according to the present invention.

As shown in FIG. 1, a rechargeable battery 10, which functions as a power storage device, includes a cuboid case 11. The case 11 accommodates an electrode assembly 12. The case 11 includes a case body 11a, which has the form of a tetragonal tube having a closed end and is formed from metal (e.g., aluminum or aluminum alloy), and a lid 11b, which closes an opening of the case body 11a. The case 11 contains an electrolyte (electrolytic solution), which is not shown in the drawings. The rechargeable battery 10 is a lithium-ion rechargeable battery.

Figure 2:
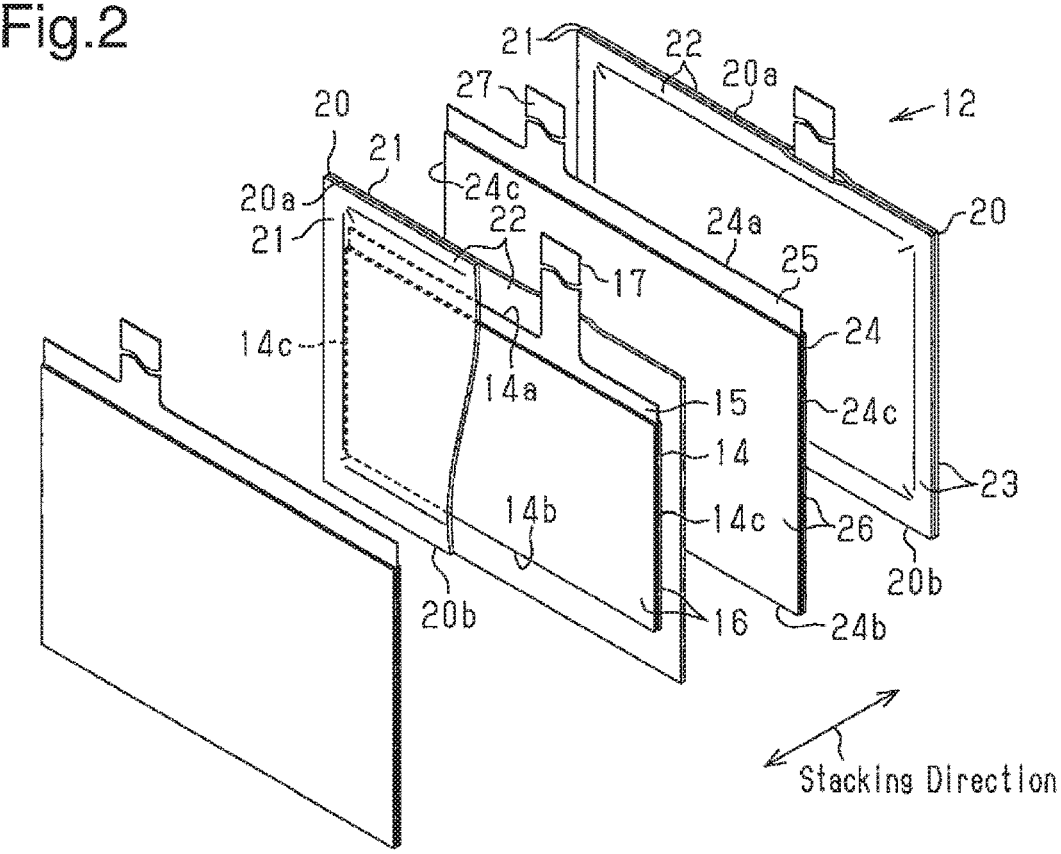
FIG. 2 is an exploded perspective view of an electrode assembly.

As shown in FIG. 2, the electrode assembly 12 includes electrode accommodation separators 20, each of which accommodates a positive electrode 14, and negative electrodes 24, which differ in polarity from the positive electrodes 14. The electrode assembly 12 has a stack structure in which a plurality of electrode accommodation separators 20 and a plurality of negative electrodes 24 are alternately stacked one on another. More specifically, the positive electrodes 14 and the negative electrodes 24 are alternately stacked one on another with a separator member 21 of the electrode accommodation separators 20 located in between. Each of the positive electrodes 14, the separator members 21, and the negative electrodes 24 is rectangular.

The direction in which the electrode accommodation separators 20 and the negative electrodes 24 are stacked one on another is referred to as the stacking direction of the electrode assembly 12. The dimension of the electrode assembly 12 in the stacking direction is referred to as the thickness of the electrode assembly 12. The dimension of the opening in a direction in which the short sides extend is referred to as the opening width of the case body 11a. The thickness of the electrode assembly 12 is slightly less than the opening width of the case body 11a. Thus, each of two opposite end surfaces of the electrode assembly 12 in the stacking direction is separated by only a slight clearance from an inner wall surface of the case body 11a opposed to the end surface of the electrode assembly 12.

Each positive electrode 14 includes a rectangular sheet of a positive metal foil 15 (e.g., aluminum foil) and positive active material layers 16, which are located on two opposite surfaces of the positive metal foil 15 and contain a positive active material. The positive electrode 14 has two long sides and two short sides. One of the two long sides is referred to as a first edge 14a. The positive electrode 14 includes a positive electrode tab 17, which is a non-applied portion projecting from the first edge 14a.

The positive electrode tab 17 forms a portion of the positive metal foil 15 to which the positive active material layers 16 are not applied.

The first edge 14a is one side of the positive electrode 14. The other side of the positive electrode 14 opposed to the first edge 14a is referred to as a second edge 14b. The first edge 14a and the second edge 14b are connected by the two short sides, each of which is referred to as a third edge 14c. The positive electrode 14 includes a non-applied portion extending along the first edge 14a in addition to the positive electrode tab 17. The non-applied portion other than the positive electrode tab 17 may be omitted from the positive electrode 14.

Each negative electrode 24 includes a rectangular sheet of a negative metal foil 25 (e.g., copper foil) and negative active material layers 26, which are located on two opposite surfaces of the negative metal foil 25 and contain a negative active material. The negative electrode 24 also has two long sides and two short sides. One of the two long sides is referred to as a first edge 24a. The negative electrode 24 includes a negative electrode tab 27, which is a non-applied portion projecting from the first edge 24a. The negative electrode tab 27 forms a portion of the negative metal foil 25 to which the negative active material layers 26 are not applied.

The first edge 24a is one side of the negative electrode 24. The other side of the negative electrode 24 opposed to the first edge 24a is referred to as a second edge 24b. The first edge 24a and the second edge 24b are connected by the two short sides, each of which is referred to as a third edge 24c. The negative electrode 24 includes a non-applied portion extending along the first edge 24a in addition to the negative electrode tab 27. The non-applied portion other than the negative electrode tab 27 may be omitted from the negative electrode 24.

The first edge 24a of the negative electrode 24 is longer than the first edge 14a of the positive electrode 14. The second edge 24b of the negative electrode 24 is longer than the second edge 14b of the positive electrode 14. Additionally, the third edges 24c of the negative electrode 24 are longer than the third edges 14c of the positive electrode 14. Thus, the negative electrode 24 is slightly larger than the positive electrode 14.

Each electrode accommodation separator 20 includes rectangular sheets of the separator members 21 opposed to each other. Each of the separator members 21 is formed from an insulative resin (e.g., polyethylene). The two sheets of the separator members 21 have the same shape and the same size and are slightly larger than the positive electrode 14. Each separator member 21 includes a first extension 22, which extends from the first edge 14a in a projection direction of the positive electrode tab 17 when the separator member 21 is arranged on the positive electrode 14.

Additionally, each separator member 21 includes a second extension 23, which extends from the second edge 14b and the two third edges 14c of the positive electrode 14 in three directions. Thus, the second extension 23 is U-shaped in a plan view of the electrode accommodation separator 20. The extension width of the first extension 22 is the same as the extension width of the second extension 23.

A portion of the second extension 23 extending along the second edge 14b extends in a direction opposite to the positive electrode tab 17. A portion of the second extension 23 extending along each third edge 14c extends in a direction orthogonal to the projection direction of the positive electrode tab 17. Thus, the extension direction of each portion of the second extension 23 extending along the second edge 14b and the third edges 14c differs from the extension direction of the first extension 22.

The electrode accommodation separator 20 is formed by joining the first extensions 22 and the second extensions 23 of the separator members 21 to each other. The portion of the electrode accommodation separator 20 where the first extensions 22 are joined to each other includes a lid side contact portion 20a. Additionally, the portion of the electrode accommodation separator 20 where the second extensions 23 that extend along the second edges 14b are joined to each other includes a bottom side contact portion 20b.

Figure 3:
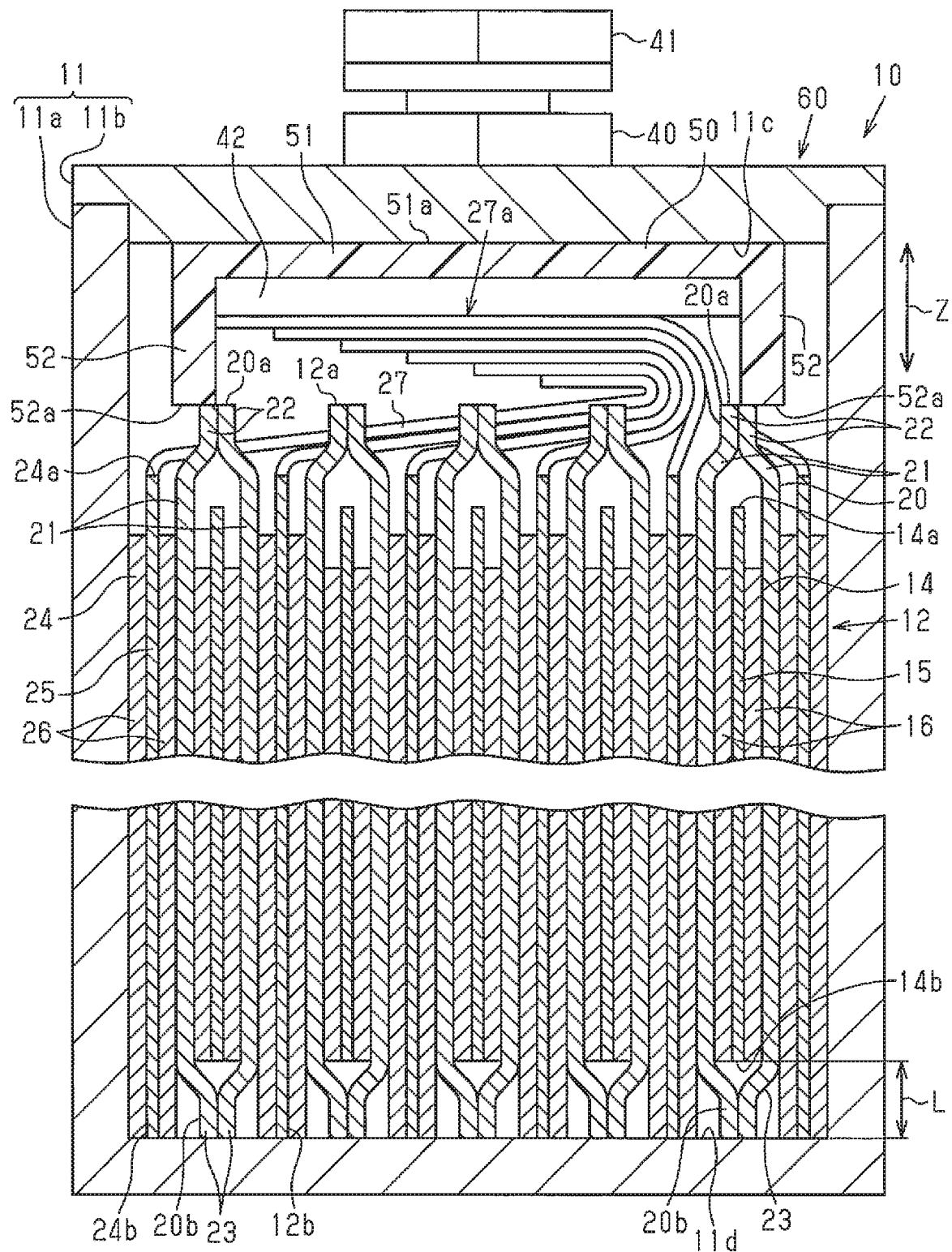
FIG. 3 is a partially cross-sectional view showing an internal structure of the rechargeable battery.

As shown in FIG. 1 or 3, an end surface of the electrode assembly 12 that is opposed to the lid 11b includes a tab side end surface 12a. Additionally, the electrode assembly 12 includes a positive electrode tab group 17a and a negative electrode tab group 27a, which are located on the tab side end surface 12a. The tab side end surface 12a is formed by stacking the lid side contact portions 20a one on another. The positive electrode tab group 17a is formed by stacking the positive electrode tabs 17 one on another. The negative electrode tab group 27a is formed by stacking the negative electrode tabs 27 one on another. The positive electrode tabs 17 and the negative electrode tabs 27 are collected at one end of the electrode assembly 12 in the stacking direction and then bent toward the other end to form the positive electrode tab group 17a and the negative electrode tab group 27a, respectively. The lid side contact portion 20a extends beyond the first edge 24a of the negative electrode 24 in the projection direction of the negative electrode tab 27. Thus, the distal end of the lid side contact portion 20a is located closer to the lid 11b than the first edge 24a of the negative electrode 24 and the first edge 14a of the positive electrode 14.

Additionally, an end surface of the electrode assembly 12 that is opposed to an inner bottom surface 11d of the case body 11a includes a bottom side end surface 12b. The bottom side end surface 12b is formed by stacking the bottom side contact portions 20b of the electrode accommodation separators 20 and the second edges 24b of the negative electrodes 24 one on another. The bottom side contact portions 20b and the second edges 24b are in contact with the inner bottom surface 11d of the case 11. Thus, the electrode accommodation separators 20 and the negative electrodes 24 are directly supported by the inner bottom surface 11d of the case 11. Hence, the bottom side contact portions 20b of the electrode accommodation separators 20 are coplanar with the second edges 24b of the negative electrodes 24.

As described above, there is only a slight clearance between each end surface of the electrode assembly 12 in the stacking direction and the inner wall surface of the case body 11a opposed to the end surface of the electrode assembly 12. Additionally, the bottom side end surface of the electrode assembly 12 is in contact with the inner bottom surface 11d of the case body 11a. This is due to the design that increases the volume of the electrode assembly 12 to the maximum extent so that the capacity of the rechargeable battery 10 is maximized.

Additionally, as shown in FIG. 3, the bottom side contact portions 20b of the electrode accommodation separators 20 are extended from the second edges 14b of the positive electrodes 14 by a dimension L. The dimension L is greater than the thickness of the separator member 21. The bottom side contact portions 20b separate the second edges 14b of the positive electrodes 14 from the inner bottom surface 11d of the case 11 by the dimension L. The second edges 24b of the negative electrodes 24 are in contact with the inner bottom surface 11d of the case 11. Thus, the second edges 14b of the positive electrodes 14 are located closer to the lid 11b than the second edges 24b of the negative electrodes 24 by the dimension L of the bottom side contact portions 20b. Additionally, the entire surface of each positive active material layer 16 of the positive electrodes 14 is opposed to the negative active material layer 26 with the separator member 21 located in between. In the rechargeable battery 10, the direction in which an inner surface 11c of the lid 11b is connected to each tab side end surface 12a by the shortest distance is referred to as the opposing direction Z.

As shown in FIG. 1, the rechargeable battery 10 includes a positive terminal 30, which functions as a positive electrode terminal, and a negative terminal 40, which functions as a negative electrode terminal. The positive terminal 30 projects out of the case 11 when fixed to the lid 11b. The negative terminal 40 projects out of the case 11 when fixed to the lid 11b. The upper end portion of the negative terminal 40 has external threads, which are not shown in the drawings, and projects out of the case 11. The external threads of the upper end portion of the negative terminal 40 engage with a nut 41. The negative terminal 40 has a lower end portion, which is not shown in the drawings and projected to an inner side of the case 11. When the lid 11b is held between the lower end portion and the nut 41, the negative terminal 40 is fastened to the lid 11b.

The lower end portion of the negative terminal 40 is joined to a flat rectangular negative conductive member 42 formed from metal (e.g., copper). The negative terminal 40 is electrically connected to the negative electrode tab group 27a of the electrode assembly 12 by the negative conductive member 42. The negative conductive member 42 is located parallel to the tab side end surface 12a of the electrode assembly 12. The negative conductive member 42 is located between the tab side end surface 12a and the inner surface 11c of the lid 11b.

The upper end portion of the positive terminal 30 has external threads, which are not shown in the drawings, and projects out of the case 11. The external threads of the upper end portion of the positive terminal 30 engage with a nut 31. The positive terminal 30 has a lower end portion projecting to an inner side of the case 11. When the lid 11b is held between the lower end portion and the nut 31, the positive terminal 30 is fastened to the lid 11b.

The lower end portion of the positive terminal 30 is electrically connected to a flat rectangular positive conductive member 32 formed from metal (e.g., aluminum). The positive terminal 30 is electrically connected to the positive electrode tab group 17a of the electrode assembly 12 by the positive conductive member 32. The positive conductive member 32 is located parallel to the tab side end surface 12a of the electrode assembly 12. The positive conductive member 32 is located between the tab side end surface 12a and the inner surface 11c of the lid 11b.

As shown in FIGS. 1 and 3, the rechargeable battery 10 includes an insulation member 50 in the case 11. The insulation member 50 insulates the negative conductive member 42 and the positive conductive member 32 from the lid 11b. The insulation member 50 is formed, for example, from a resin. The insulation member 50 includes a flat rectangular body 51 and side walls 52. The side walls 52 extend from the edges of two long sides of the body 51 toward the electrode assembly 12. The insulation member 50 is inverted U-shaped in a cross-sectional view in a direction in which the short sides extend. The body 51 bridges the negative conductive member 42 and the positive conductive member 32. The short-side dimension of the body 51 is less than the short-side dimension of the lid 11b and slightly greater than the short-side dimensions of the negative conductive member 42 and the positive conductive member 32. The side walls 52 project from the body 51 toward the tab side end surface 12a of the electrode assembly 12.

The upper surface of the body 51, which is opposed to the inner surface 11c of the lid 11b, is referred to as an outer surface 51a. The lower surface of each of the side walls 52, which is opposed to the tab side end surface 12a of the electrode assembly 12, is referred to as an insulation end surface 52a. The insulation member 50 is located between the inner surface 11c of the lid 11b and each of the positive conductive member 32 and the negative conductive member 42.

The insulation end surfaces 52a are in contact with the lid side contact portions 20a that are located closest to the two opposite ends of the electrode assembly 12 in the stacking direction. The lid side contact portions 20a are bent due to the contact with the insulation end surfaces 52a.

The operation of the rechargeable battery 10 will now be described together with the method for assembling the rechargeable battery 10.

First, the electrode assembly 12 is formed. Then, after the positive conductive member 32 is welded to the positive electrode tab group 17a, the positive terminal 30 is welded to the positive conductive member 32. Also, after the negative conductive member 42 is welded to the negative electrode tab group 27a, the negative terminal 40 is welded to the negative conductive member 42. The negative conductive member 42 and the positive conductive member 32 are covered with the body 51 of the insulation member 50. The insulation member 50 is integrated with the negative conductive member 42 and the positive conductive member 32. In this state, the external threads of the positive terminal 30 and the external threads of the negative terminal 40 are inserted through the lid 11b. The nut 31 engages with the positive external threads, and the nut 41 engages with the negative external threads. This fastens the positive terminal 30 and the negative terminal 40 to the lid 11b.

Figure 4:
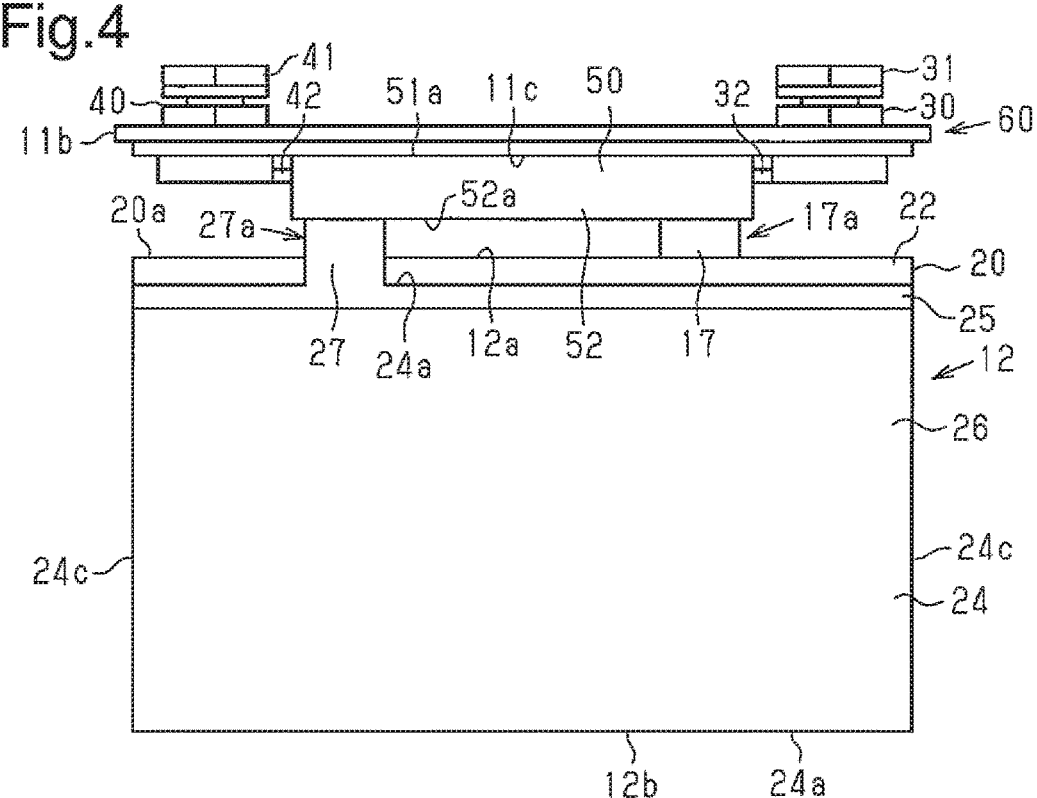
FIG. 4 is a front view of a lid terminal member and the electrode assembly that are integrated with each other.

As a result, as shown in FIG. 4, the lid 11b, the positive conductive member 32, the negative conductive member 42, the positive terminal 30, the negative terminal 40, and the insulation member 50 are integrated with each other to form a lid terminal member 60. The lid 11b is insulated from the conductive members 32, 42 by the insulation member 50. The lid terminal member 60 is connected to the electrode assembly 12 by the positive electrode tab group 17a and the negative electrode tab group 27a.

The lid side contact portions 20a of the electrode accommodation separators 20 are located closer to the lid terminal member 60 than the first edges 24a of the negative electrodes 24 and the first edges 14a of the positive electrodes 14. The distal end of each lid side contact portion 20a is separated from the insulation end surface 52a of the insulation member 50 of the lid terminal member 60 in the opposing direction Z.

Figure 5:
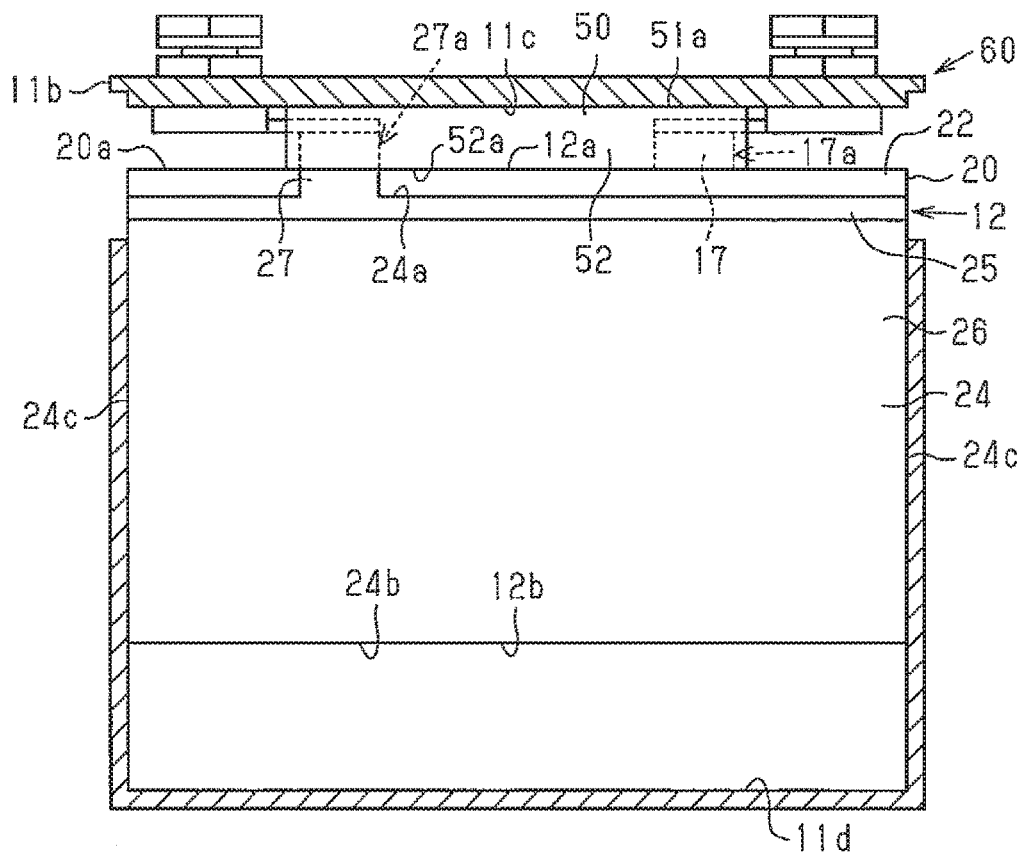
FIG. 5 is a cross-sectional view of a state in which the electrode assembly is forced into a case body with the lid terminal member.

As shown in FIG. 5, the electrode assembly 12 is inserted into the case body 11a from the opening of the case body 11a. At this time, the lid 11b is pushed toward the electrode assembly 12 to force the electrode assembly 12 into the case body 11a with the lid terminal member 60. The force pushing the lid terminal member 60 is transmitted through the positive electrode tab group 17a and the negative electrode tab group 27a to the electrode assembly 12 to bring the bottom side contact portions 20b of the electrode accommodation separators 20 and the second edges 24b of the negative electrodes 24 into contact with the inner bottom surface 11d of the case body 11a.

Consequently, the positive electrode tab group 17a and the negative electrode tab group 27a are pressed and bent in the opposing direction Z. Thus, the force pushing the lid terminal member 60 is absorbed by the positive electrode tab group 17a and the negative electrode tab group 27a. When the positive electrode tab group 17a and the negative electrode tab group 27a are bent, the insulation end surfaces 52a of the insulation member 50 come into contact with the lid side contact portions 20a of the electrode accommodation separators 20. Subsequently, when the accommodation of the electrode assembly 12 in the case body 11a is completed, the lid 11b is joined to the case body 11a. This closes the opening of the case body 11a and completes the assembling of the rechargeable battery 10.

The above embodiment has the advantages described below.

(1) The bottom side contact portions 20b of the electrode accommodation separators 20 and the second edges 24b of the negative electrodes 24 are in contact with the inner bottom surface 11d of the case 11, and the insulation member 50 of the lid terminal member 60 is in contact with the lid side contact portions 20a of the electrode accommodation separators 20. With this structure, when manufacturing the rechargeable battery 10, the electrode assembly 12 that is integrated with the lid terminal member 60 is forced into the case body 11a, and the lid side contact portions 20a of the electrode accommodation separators 20 come into contact with the lid terminal member 60 and are bent to absorb the force pushing the lid terminal member 60. Thus, the force pushing the lid terminal member 60 is weakened so that collision of the bottom side contact portions 20b of the electrode accommodation separators 20 and the second edges 24b of the negative electrodes 24 with the inner bottom surface 11d of the case 11 is avoided.

(2) When the lid terminal member 60 is pushed toward the electrode assembly 12 and the lid terminal member 60 comes into contact with the lid side contact portions 20a of the electrode accommodation separators 20, the lid side contact portions 20a are bent so that collision of the lid terminal member 60 with the first edges 24a of the negative electrodes 24 is avoided. This limits damage to the negative electrodes 24.

(3) Each electrode accommodation separator 20 is formed by joining two sheets of the separator members 21. This structure increases the rigidity of the lid side contact portion 20a as compared to when the electrode accommodation separator 20 is formed by one sheet of the separator member 21. Thus, the collision of the lid terminal member 60 with the first edges 24a of the negative electrodes 24 is avoided by the lid side contact portions 20a. The bottom side contact portion 20b of the electrode accommodation separator 20 is also formed by bonding two sheets of the separator members 21. This also increases the rigidity of the bottom side contact portion 20b as compared to when the electrode accommodation separator 20 is formed by one sheet of the separator member 21. Additionally, as compared to when one sheet of a separator member 21 is folded and the folded portion is used as a bottom side contact portion, the thickness of the bottom side contact portion 20b is increased. As a result, the bottom side contact portions 20b easily absorb an impact generated when the bottom side contact portions 20b contact the inner bottom surface 11d of the case body 11a. This limits damage to the positive electrodes 14.

(4) The impact generated when the bottom side contact portions 20b of the electrode accommodation separators 20 contact the inner bottom surface 11d of the case body 11a is also received by the separator members 21 together with the bottom side contact portions 20b. In this regard, the positive electrodes 14 are enclosed by the separator members 21. Thus, even when the separator members 21 receive an impact, the positive electrodes 14 are not easily displaced and maintain the state opposed to the negative electrodes 24.

(5) The bottom side contact portions 20b of the electrode accommodation separators 20 and the second edges 24b of the negative electrodes 24 are in contact with the inner bottom surface 11d of the case body 11a, and the bottom side contact portions 20b are coplanar with the second edges 24b. Thus, both the separator members 21 and the negative electrodes 24 are capable of receiving an impact generated when the electrode assembly 12 contacts the inner bottom surface 11d of the case body 11a. This limits damage to the bare negative electrodes 24.

(6) The bottom side contact portions 20b of the electrode accommodation separators 20 and the second edges 24b of the negative electrodes 24 are in contact with the inner bottom surface 11d of the case body 11a, and the bottom side contact portions 20b are coplanar with the second edges 24b. Thus, the second edges 14b of the positive electrodes 14 are located closer to the lid 11b than the second edges 24b of the negative electrodes 24 by the height of the bottom side contact portion 20b. Therefore, even when the electrode assembly 12 has a structure in which the bottom side contact portions 20b are aligned with the second edges 24b, the entire surface of each positive active material layer 16 is opposed to the entire surface of the corresponding negative active material layer 26 of the negative electrodes 24.

Second Embodiment

A second embodiment of a power storage device, as a rechargeable battery, according to the present invention will now be described with reference to FIGS. 6 to 8. In the second embodiment, the portions that are the same as the first embodiment will not be described in detail. In the following description, the upper side and the lower side are defined as shown in FIG. 6.

Figure 6:
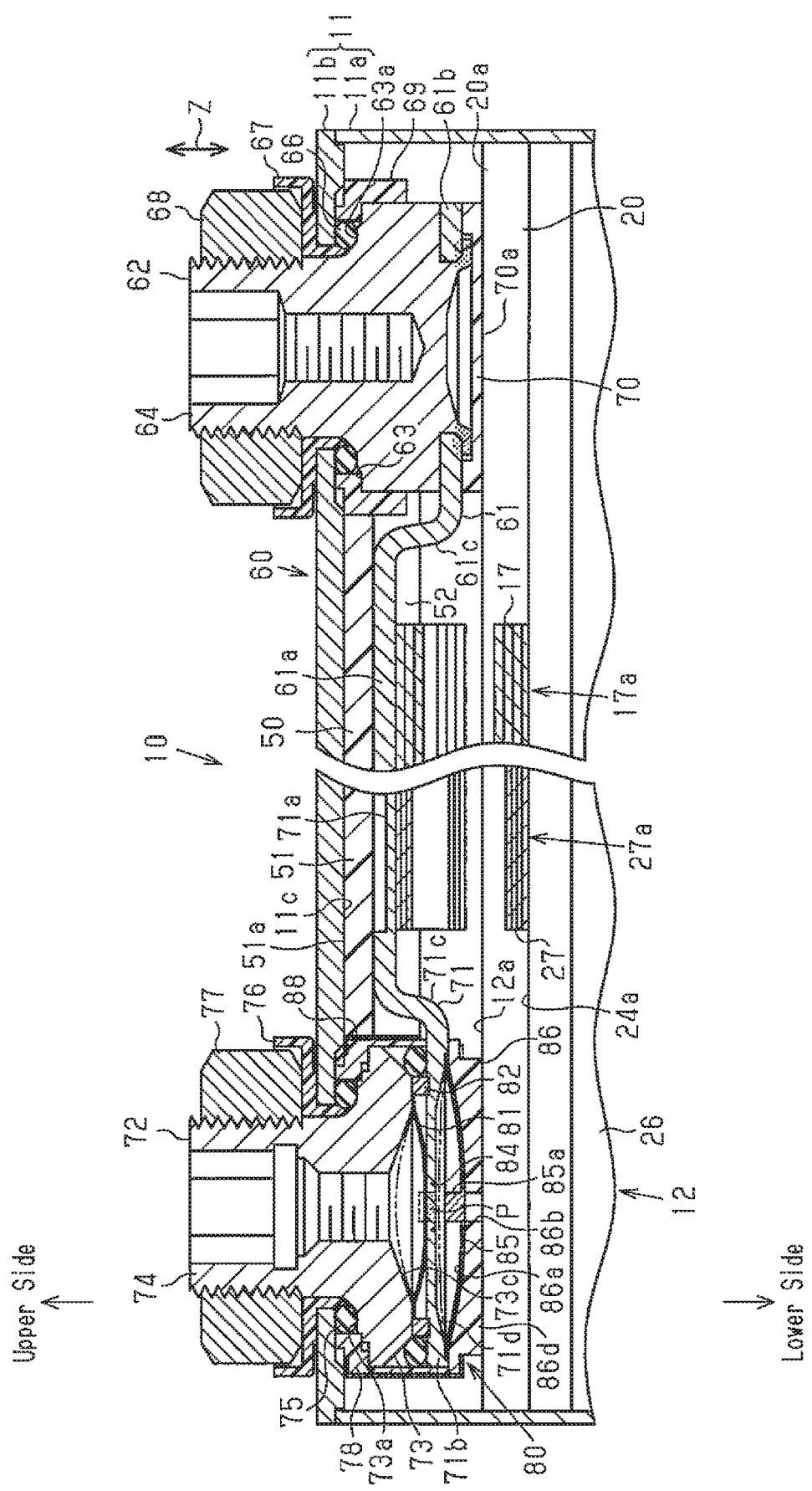
FIG. 6 is a partially cross-sectional view showing a second embodiment of a rechargeable battery of a power storage device according to the present invention.
Figure 7:
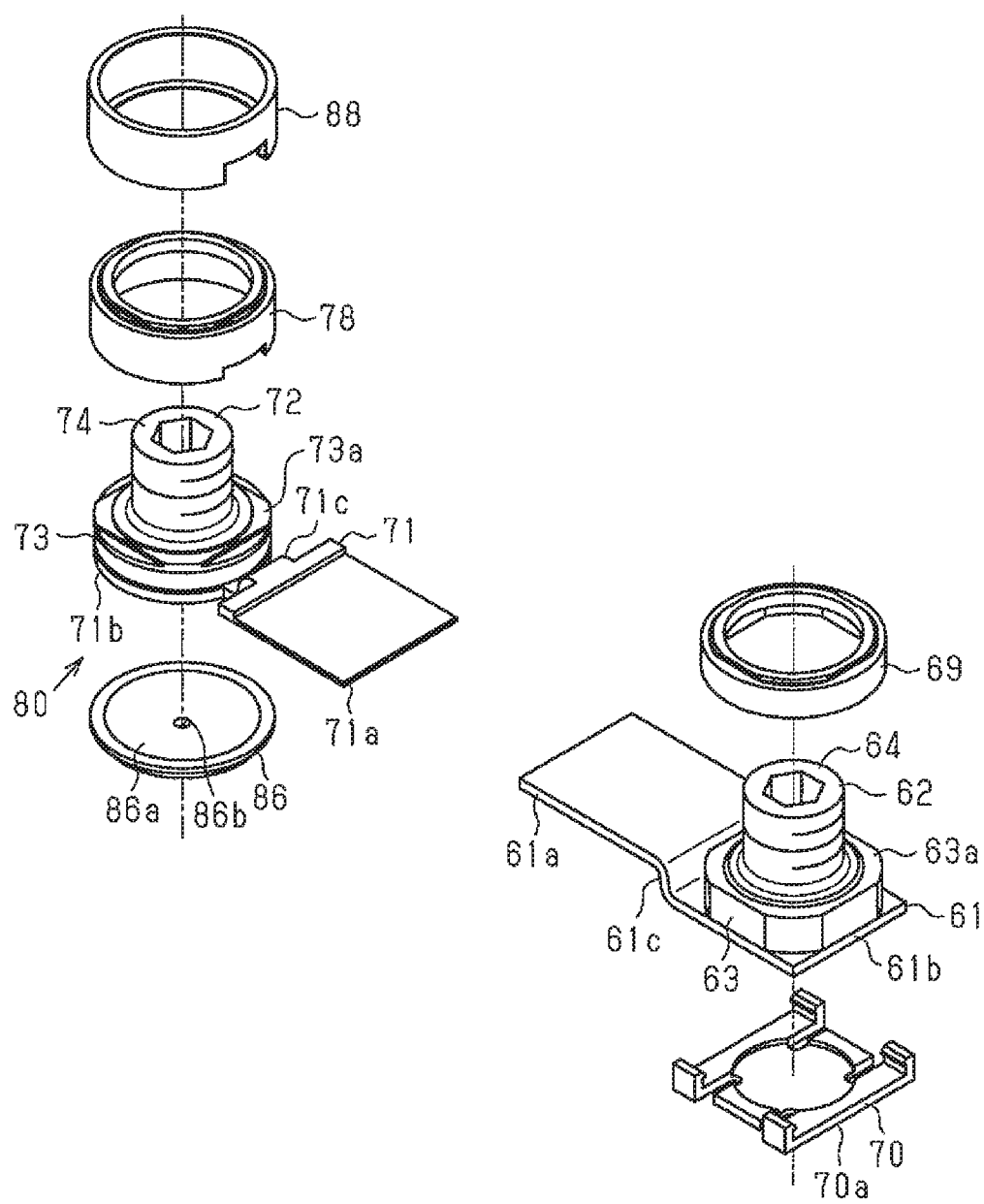
FIG. 7 is an exploded perspective view showing a portion of the rechargeable battery.

As shown in FIG. 6 or 7, a positive conductive member 61 includes a first joining portion 61a located close to the lid 11b, a second joining portion 61b located closer to the electrode assembly 12 than the first joining portion 61a, and a curved third joining portion 61c connecting the first joining portion 61a and the second joining portion 61b. The first joining portion 61a includes a lower surface, which is opposed to the tab side end surface 12a of the electrode assembly 12. The positive electrode tab group 17a is welded to the lower surface of the first joining portion 61a.

A positive terminal 62 includes a positive electrode head 63 having the form of a polygonal rod and a cylindrical positive electrode shank 64 projecting from a seat surface 63a of the positive electrode head 63. The positive electrode shank 64 includes an outer circumferential surface having thread grooves. The positive electrode shank 64 extends through the lid 11b and projects out of the case 11. The positive electrode head 63 projects into the case 11.

The rechargeable battery 10 includes an insulative O-ring 66, an insulative flanged ring 67, and a nut 68. The positive electrode shank 64 is inserted through the O-ring 66. The O-ring 66 is supported by the seat surface 63a of the positive electrode head 63. The positive electrode shank 64 is also inserted through the flanged ring 67. The nut 68 engages with the positive electrode shank 64 from the upper side of the flanged ring 67. The engagement of the nut 68 with the positive electrode shank 64 unitizes the positive terminal 62 and the lid 11b. The flanged ring 67 is located between the positive electrode shank 64 and the lid 11b and also between the nut 68 and the lid 11b.

The positive electrode head 63 is located in the case 11. The second joining portion 61b of the positive conductive member 61 is welded to the lower surface of the positive electrode head 63, which is opposed to the electrode assembly 12. Thus, the positive terminal 62 is electrically connected to the electrode assembly 12 by the positive conductive member 61. When the positive terminal 62 is electrically connected to the positive conductive member 61 and the positive conductive member 61 is electrically connected to the positive electrode tab group 17a, a current path is formed between the electrode assembly 12 and the positive terminal 62.

The rechargeable battery 10 includes a first positive insulation member 69 and a second positive insulation member 70. The first positive insulation member 69 is located to cover the seat surface 63a of the positive electrode head 63. The second positive insulation member 70 is located between the positive conductive member 61 and the electrode assembly 12. The first positive insulation member 69 limits contact of the lid 11b with the positive electrode head 63. The first positive insulation member 69 is coupled to the positive electrode head 63 from the upper side. The first positive insulation member 69 partially covers the seat surface 63a and the outer circumferential surface of the positive electrode head 63. The second positive insulation member 70 limits contact of the positive conductive member 61 with the electrode assembly 12. The lower surface of the second positive insulation member 70, which is opposed to the tab side end surface 12a of the electrode assembly 12, is referred to as an insulation end surface 70a.

A negative conductive member 71 includes a first joining portion 71a located close to the lid 11b, a second joining portion 71b located closer to the electrode assembly 12 than the first joining portion 71a, and a curved third joining portion 71c connecting the first joining portion 71a and the second joining portion 71b. The first joining portion 71a includes a lower surface, which is opposed to the tab side end surface 12a of the electrode assembly 12. The negative electrode tab group 27a is welded to the lower surface of the first joining portion 71a.

The rechargeable battery 10 includes the insulation member 50 in the case 11. The insulation member 50 insulates the first joining portion 71a of the negative conductive member 71 and the first joining portion 61a of the positive conductive member 61 from the lid 11b. The projection length of the side walls 52 from the body 51 of the insulation member 50 is shorter than that of the first embodiment. Thus, the side walls 52 of the insulation member 50 are out of contact with the lid side contact portions 20a.

A negative terminal 72 includes a cylindrical negative electrode head 73 and a cylindrical negative electrode shank 74 projecting from a seat surface 73a of the negative electrode head 73. The negative electrode shank 74 includes an outer circumferential surface having thread grooves. The negative electrode shank 74 extends through the lid 11b and projects out of the case 11. The negative electrode head 73 is located in the case 11. The negative electrode head 73 includes a terminal recess 73c formed in the lower surface opposed to the electrode assembly 12. The terminal recess 73c is bowl-shaped and sunken toward the lid 11b.

The rechargeable battery 10 further includes an insulative O-ring 75, an insulative flanged ring 76, and a nut 77. The negative electrode shank 74 is inserted through the O-ring 75. The O-ring 75 is supported by the seat surface 73a of the negative electrode head 73. The negative electrode shank 74 is also inserted through the flanged ring 76. The nut 77 engages with the negative electrode shank 74 from the upper side of the flanged ring 76. The engagement of the nut 77 with the negative electrode shank 74 unitizes the negative terminal 72 and the lid 11b. The flanged ring 76 is located between the negative electrode shank 74 and the lid 11b and also between the nut 77 and the lid 11b.

The rechargeable battery 10 includes an insulative cover 78 covering the seat surface 73a of the negative electrode head 73. The cover 78 is tubular. The cover 78 is supported by the seat surface 73a. The cover 78 is located between the lid 11b and the seat surface 73a of the negative electrode head 73 to limit contact of the lid 11b with the negative electrode head 73.

The rechargeable battery 10 includes a current interruption portion 80 integrated with the negative terminal 72. The current interruption portion 80 is located in the case 11. When the internal pressure of the case 11 reaches a predetermined set pressure, the current interruption portion 80 interrupts the current flowing in a current path that electrically connects the electrode assembly 12 and the negative terminal 72. The current interruption portion 80 is located at a portion connecting the negative electrode head 73 of the negative terminal 72 and the second joining portion 71b of the negative conductive member 71. In the present embodiment, the negative electrode head 73 is electrically connected to the negative conductive member 71 by the current interruption portion 80, and the negative conductive member 71 is electrically connected to the negative electrode tab group 27a so that the current path is formed between the electrode assembly 12 and the negative terminal 72.

When activated by gases generated in the case 11, the current interruption portion 80 interrupts the electrical connection of the negative electrode head 73 of the negative terminal 72 and the negative conductive member 71. More specifically, when the current interruption portion 80 is not activated, the current interruption portion 80 partially forms the current path described above. When activated by gases generated in the case 11, the current interruption portion 80 disconnects the current path.

The current interruption portion 80 includes a contact plate 81 joined to the second joining portion 71b and the negative electrode head 73. The contact plate 81 is formed from a conductive material and is bowl-shaped and convex toward the electrode assembly 12. The contact plate 81 covers the terminal recess 73c from the lower side.

In a normal state, the portion of the contact plate 81 opposed to the terminal recess 73c is convex toward the electrode assembly 12. The convex portion of the contact plate 81 is welded to the second joining portion 71b of the negative conductive member 71. In FIG. 6, the portion indicated by dots and hatching is a negative weld portion P, which is the portion welding the contact plate 81 and the second joining portion 71b, and functions as a connection portion that connects the negative electrode head 73 of the negative terminal 72 and the negative conductive member 71. Thus, the negative conductive member 71 and the negative terminal 72 are electrically connected to each other by the contact plate 81.

The current interruption portion 80 includes an insulation ring 82 located between the negative electrode head 73 and the second joining portion 71b. The insulation ring 82 surrounds the peripheral edge of the contact plate 81 to hold the negative electrode head 73 and the negative conductive member 71 at a predetermined distance.

The negative conductive member 71 includes an interruption recess 71d arranged in the lower surface of the second joining portion 71b, which is opposed to the electrode assembly 12. The interruption recess 71d is bowl-shaped and sunken toward the lid 11b. The negative weld portion P is located in the bottom surface of the interruption recess 71d. The second joining portion 71b includes a groove 84 arranged in a portion defining the bottom surface of the interruption recess 71d. The groove 84 is annular and surrounds the negative weld portion P.

The current interruption portion 80 includes a deformation plate 85, which deforms when receiving the internal pressure of the case 11. The deformation plate 85 is a diaphragm formed from an elastic material, which is for example, a metal plate, and is located closer to the electrode assembly 12 than the second joining portion 71b. The deformation plate 85 is discoid and covers the interruption recess 71d from the lower side. The entire outer circumference of the deformation plate 85 is welded to the second joining portion 71b. The deformation plate 85 hermetically separates the inside of the case 11 from the exterior.

In a normal state, the deformation plate 85 is convex toward the electrode assembly 12. The deformation plate 85 includes a projection 85a projecting toward the lid 11b at a location opposed to the projected negative weld portion P. The projection 85a is formed from an insulative material. The projection 85a is opposed to the negative weld portion P, which is surrounded by the groove 84.

The current interruption portion 80 includes a protection member 86, which functions as an insulation member formed from a synthetic resin. The protection member 86 is located closer to the electrode assembly 12 than the deformation plate 85. The protection member 86 is located between the deformation plate 85 and the electrode assembly 12. The protection member 86 prevents deformation of the deformation plate 85 when receiving an impact. The protection member 86 is discoid. The upper surface of the protection member 86 is recessed in conformance with the shape of the surface of the deformation plate 85 to form a support recess 86a. A gas hole 86b vertically extends through the bottom surface of the support recess 86a. The protection member 86 further includes an insulation end surface 86d opposed to the tab side end surface 12a of the electrode assembly 12.

The external pressure (generally atmospheric pressure) of the case 11 acts on the upper surface of the deformation plate 85, which is opposed to the lid 11b, through the inner side of the negative electrode shank 74. Also, the inner pressure of the case 11 acts on the lower surface of the deformation plate 85, which is opposed to the electrode assembly 12, through the gas hole 86b. When the internal pressure acting on the lower surface of the deformation plate 85 is greater than the set pressure, the deformation plate 85 deforms and becomes convex toward the lid 11*b*.

The rechargeable battery 10 includes a swage member 88 unitizing the negative electrode head 73, the contact plate 81, the insulation ring 82, the negative conductive member 71 (second joining portion 71*b*), the deformation plate 85, and the protection member 86.

In the second embodiment, the lid 11*b*, the positive conductive member 61, the positive terminal 62, the O-ring 66, the flanged ring 67, the nut 68, the first positive insulation member 69, and the second positive insulation member 70 are unitized at the positive electrode side of the lid terminal member 60. Also, the lid 11*b*, the negative conductive member 71, the negative terminal 72, the O-ring 75, the flanged ring 76, the nut 77, the cover 78, and the current interruption portion 80 are unitized at the negative electrode side of the lid terminal member 60. The lid 11*b* is insulated from the conductive members 61, 71 by the insulation member 50. The positive terminal 62 is insulated from the electrode assembly 12 by the second positive insulation member 70. The negative terminal 72 is insulated from the electrode assembly 12 by the protection member 86. The lid terminal member 60 and the electrode assembly 12 are connected to each other by the positive electrode tab group 17*a* and the negative electrode tab group 27*a*.

In the rechargeable battery 10 of the second embodiment, if gases are generated in the electrode assembly 12 during overcharging or over-discharging, the internal pressure of the case 11 increases. As indicated by the double-dashed line in FIG. 6, if the internal pressure reaches the set pressure, the deformation plate 85 receives the pressure and deforms to become convex toward the negative weld portion P. The projection 85*a* collides with the negative weld portion P, which is surrounded by the groove 84, and breaks the negative weld portion P of the negative conductive member 71 to deform the contact plate 81 toward the lid 11*b*. This separates the contact plate 81 from the negative conductive member 71. Consequently, the electrical connection of the negative conductive member 71 and the negative terminal 72 is physically interrupted, and the current flowing between the electrode assembly 12 and the negative terminal 72 is interrupted.

Figure 8:
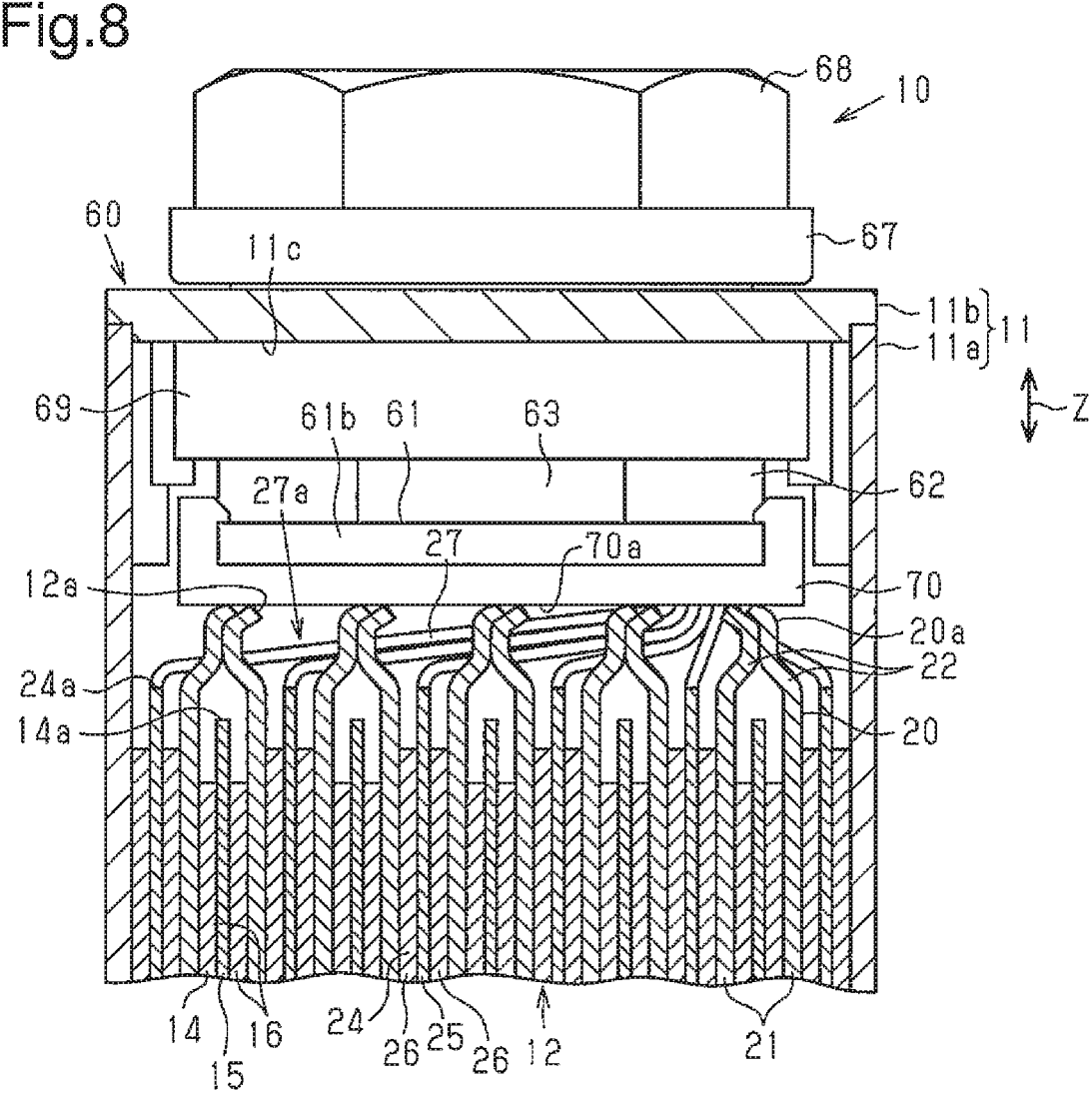
FIG. 8 is a partially cross-sectional view showing an internal structure of the rechargeable battery.

As shown in FIG. 8, a plurality of lid side contact portions 20*a* is in contact with the insulation end surface 70*a* of the second positive insulation member 70 located in the proximity of the positive conductive member 61. The lid side contact portions 20*a* are bent due to the contact with the insulation end surface 70*a*. In the same manner, although not shown in the drawings, a plurality of lid side contact portions 20*a* is in contact with the insulation end surface 86*d* of the protection member 86 located in the proximity of the negative conductive member 71. The lid side contact portions 20*a* are also bent due to the contact with the insulation end surface 70*a*.

In the same manner as the first embodiment, when manufacturing the rechargeable battery 10 of the second embodiment, after assembling the lid terminal member 60, the electrode assembly 12 is inserted into the case body 11*a* from the opening of the case body 11*a*. At this time, the lid 11*b* is pushed toward the electrode assembly 12 to force the electrode assembly 12 into the case body 11*a* with the lid terminal member 60. The bottom side contact portions 20*b* of the electrode accommodation separators 20 and the second edges 24*b* of the negative electrodes 24 come into contact with the inner bottom surface 11*d* of the case body 11*a*.

Consequently, the positive electrode tab group 17*a* and the negative electrode tab group 27*a* are pressed and bent in the opposing direction Z to absorb the force pushing the lid terminal member 60. When the positive electrode tab group 17*a* and the negative electrode tab group 27*a* are bent, the insulation end surface 70*a* of the second positive insulation member 70 comes into contact with the lid side contact portions 20*a* of the electrode accommodation separators 20 at the positive electrode side. The insulation end surface 86*d* of the protection member 86 comes into contact with the lid side contact portions 20*a* of the electrode accommodation separators 20 at the negative electrode side.

Accordingly, the second embodiment has the advantage described below in addition to the advantages (2) to (6) of the first embodiment.

(7) The bottom side contact portions 20*b* of the electrode accommodation separators 20 and the second edges 24*b* of the negative electrodes 24 are in contact with the inner bottom surface 11*d* of the case 11. Also, the second positive insulation member 70 and the protection member 86 of the lid terminal member 60 are in contact with the lid side contact portions 20*a* of the electrode accommodation separators 20. With this structure, when manufacturing the rechargeable battery 10, the electrode assembly 12 that is integrated with the lid terminal member 60 is forced into the case body 11*a*, and the lid side contact portions 20*a* of the electrode accommodation separators 20 come into contact with the lid terminal member 60 and are bent to absorb the force pushing the lid terminal member 60. Thus, the force pushing the lid terminal member 60 is weakened so that collision of the bottom side contact portions 20*b* of the electrode accommodation separators 20 and the second edges 24*b* of the negative electrodes 24 with the inner bottom surface 11*d* of the case 11 is avoided.

The above embodiments may be modified as follows.

In each embodiment, as long as the entire surface of each positive active material layer 16 is opposed to the negative active material layer 26, the second edges 24*b* of the negative electrodes 24 may be out of contact with the inner bottom surface 11*d* of the case body 11*a*.

In each embodiment, the separator is embodied in a bag-shaped electrode accommodation separator 20. Instead, sheets of separators may be individually located between the positive electrodes 14 and the negative electrodes 24. In this case, the positive electrodes 14, the separators, and the negative electrodes 24 are stacked one on another so that the second edges 14*b* of the positive electrodes 14 are located closer to the lid 11*b* than the second edges 24*b* of the negative electrodes 24. An adhesive tape is applied to the electrode assembly 12 to maintain the stack state.

A wound body formed by winding a strip of a positive electrode and a strip of a negative electrode may be used as an electrode assembly. In this case, a strip of a separator is wound together with the positive electrode and the negative electrode to form the electrode assembly of a rechargeable battery. In such a wound-type rechargeable battery, the electrode assembly is accommodated in the case 11 with the winding axis aligned with the depth-wise direction of the case body 11*a*.

The wound-type electrode assembly includes a bottom side contact portion, which is located on one axial end in the proximity of the inner bottom surface 11*d* of the case body 11*a*, and a lid side contact portion, which is located on the other axial end in the proximity of the lid 11*b*. The bottom side contact portion may be formed by a long edge portion of the separator, a long edge portion of the negative electrode, or the long edge portions of the separator and the negative electrode. In a wound-type electrode assembly, a plurality of non-applied portions projects from a long edge portion, which is one side of the negative electrode and the positive electrode, at intervals. Further, when the negative electrode and the positive electrode are wound, the non-applied portions having the same polarity are stacked one on another in the stacking direction to from a non-applied group.

Among the components of the lid terminal member 60, the positive conductive members 32, 61 and the negative conductive members 42, 71 may be in contact with the lid side contact portions 20a of the electrode accommodation separators 20. Further, the positive terminals 30, 62 and the negative terminals 40, 72 may be in contact with the lid side contact portions 20a of the electrode accommodation separators 20.

In each negative electrode 24, the negative active material layer 26 may be applied to only one surface of the negative metal foil 25. In the same manner, in each positive electrode 14, the positive active material layer 16 may be applied to only one surface of the positive metal foil 15.

In the rechargeable battery 10 of each embodiment, as long as the lid 11b, the positive conductive members 32, 61, and the negative conductive members 42, 71 are separated from each other, the insulation member 50 may be omitted from the lid terminal member. In this case, the positive conductive members 32, 61 and the negative conductive members 42, 71 are separated from the lid 11b by the fastening state of the positive terminals 30, 62 and the negative terminals 40, 72 to the lid 11b.

In the rechargeable battery 10 of each embodiment, a box-shaped insulation film having a closed end may be arranged in the case 11 to insulate the case 11 from the electrode assembly 12. The insulation film includes, for example, a rectangular bottom wall and four side walls upwardly extending from each side of the bottom wall and has an inner space capable of accommodating the entire electrode assembly 12. The side walls of the insulation film are located between the electrode assembly 12 and inner surfaces of the case body 11a. The bottom wall of the insulation film is located between the electrode assembly 12 and the inner bottom surface 11d of the case body 11a. In this case, the bottom side contact portions 20b of the electrode accommodation separators 20 are in contact with the inner bottom surface 11d of the case body 11a via the bottom wall of the insulation film.

Instead of the rechargeable battery 10, the power storage device may be used as a different power storage device such as an electric double-layer capacitor.

The rechargeable battery 10 is a lithium-ion rechargeable battery. Instead, a different rechargeable battery may be used. Any rechargeable battery may be used as long as ions move between a positive active material and a negative active material and exchange electric charges.

The invention claimed is:

1. A power storage device comprising:
   an electrode assembly including a non-coated portion, and a plurality of layers stacked together, each layer including a positive electrode and a negative electrode that are stacked and insulated from each other by a separator, the non-coated portion projects from one side of each of the positive electrode and the negative electrode;
   a case body of a box shape that has a closed end and an opening, wherein the electrode assembly and the non-coated portion are housed through the opening;
   a lid that closes the opening of the case body;
   an electrode terminal fixed to the lid to transfer electricity from and to the electrode assembly; and
   a conductive member that electrically connects the non-coated portion and the electrode terminal, wherein
   the lid, the electrode terminal, and the conductive member are integrated with each other to form a lid terminal member,
   the lid terminal member is integrated with the electrode assembly via the non-coated portion,
   the electrode assembly includes a bottom side contact portion that contacts an inner bottom surface of the case body,
   the separator includes a lid side contact portion that contacts the lid terminal member,
   wherein the lid side contact portion of the separator includes a bent portion, and
   the bent portion of the lid side contact portion of the separator projects beyond the one side of the negative electrode in a projection direction of the non-coated portion from the one side of the negative electrode.

2. The power storage device according to claim 1, wherein the positive electrode, the negative electrode, and the separator are rectangular sheet-shaped,
   the separator is formed by bonding separator members sandwiching the positive electrode from two opposite surfaces of the positive electrode,
   each of the separator members includes a first extension that extends beyond the one side of the positive electrode in the projection direction of the non-coated portion from the one side of the positive electrode and a second extension that extends in directions differing from an extension direction of the first extension,
   the lid side contact portion includes parts of the first extensions that are bonded to each other, and
   the bottom side contact portion includes parts of the second extensions extending toward the inner bottom surface of the case body that are bonded to each other.

3. The power storage device according to claim 1, wherein the bottom side contact portion is formed by the separator and the negative electrode, and
   the bottom side contact portion of the separator is coplanar with the bottom side contact portion of the negative electrode along the inner bottom surface of the case body.

4. The power storage device according to claim 1, wherein the power storage device includes a rechargeable battery.

5. The power storage device according to claim 1, further comprising an insulation member that insulates the lid from the conductive member.

6. The power storage device according to claim 5, wherein the lid terminal member is further integrated with the insulation member.

* * * * *